(12) United States Patent
Kim et al.

(10) Patent No.: US 8,150,899 B2
(45) Date of Patent: Apr. 3, 2012

(54) METHOD FOR FINDING MINIMAL SIGNED DIGIT WITH VARIABLE MULTI-BIT CODING BASED ON BOOTH'S ALGORITHM

(75) Inventors: Dae-Won Kim, Daegu (KR); Seong-Woon Kim, Daejon (KR); Myung-Joon Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1129 days.

(21) Appl. No.: 11/952,477

(22) Filed: Dec. 7, 2007

(65) Prior Publication Data
US 2008/0140742 A1 Jun. 12, 2008

(30) Foreign Application Priority Data

Dec. 8, 2006 (KR) .................. 10-2006-0125157

(51) Int. Cl.
*G06F 5/00* (2006.01)
(52) U.S. Cl. ...................................... 708/204
(58) Field of Classification Search .................. None
See application file for complete search history.

(56) References Cited

U.S. PATENT DOCUMENTS

| | | | |
|---|---|---|---|
| 4,495,593 A | 1/1985 | Ware | |
| 4,864,528 A * | 9/1989 | Nishiyama et al. | 708/493 |
| 4,967,388 A * | 10/1990 | Tate | 708/628 |
| 5,262,974 A * | 11/1993 | Hausman et al. | 708/493 |
| 5,262,976 A * | 11/1993 | Young et al. | 708/628 |
| 5,828,590 A | 10/1998 | Chen et al. | |
| 7,711,761 B2 * | 5/2010 | Lo Iacono et al. | 708/204 |
| 2005/0080834 A1 | 4/2005 | Belluomini et al. | |
| 2006/0020653 A1 * | 1/2006 | Lo Iacono et al. | 708/490 |
| 2008/0140742 A1 * | 6/2008 | Kim et al. | 708/204 |

FOREIGN PATENT DOCUMENTS

JP 2003-273746 9/2003

OTHER PUBLICATIONS

Homayoon Sam et al; "A Generalized Multibit Recoding of Two's Complement Binary Numbers and Its Proof with Application in Multiplier Implementations;" IEEE Transaction on Computers, vol. 39, No. 8, pp. 1006-1015, Aug. 1990.
Aiping Hu, et al; "Comparision of Constant Coefficient Multipliers for CSD and Booth Recoding;" Microelectronics, The 14th International Conference on 2002-ICM, pp. 66-69, Dec. 2002.

* cited by examiner

*Primary Examiner* — David H Malzahn
(74) *Attorney, Agent, or Firm* — Ladas & Parry LLP

(57) ABSTRACT

Provided is a method for finding a minimal signed digit with variable multi-bit coding. The method includes the steps of: scanning and grouping given multi-bit and checking the type of each group; deciding whether each group is to be performed by any one of a coding for positive number and a coding of negative number depending on the type of each group; converting the value of each group into a corresponding value of different number system and finding a signed digit based on the converted value; if the type of each group indicates the coding for negative number, performing bitwise inverting on the value of each group; and converting multi-bit subjected to the bitwise inverting into a corresponding value of different number system, and finding a signed digit based on the converted value.

9 Claims, 4 Drawing Sheets

METHOD FOR FINDING MINIMAL SIGNED DIGIT WITH VARIABLE MULTI-BIT CODING BASED ON BOOTH'S ALGORITHM

CROSS-REFERENCE(S) TO RELATED APPLICATIONS

The present invention claims priority of Korean Patent Application No. 10-2006-0125157, filed on Dec. 8, 2006, which is incorporated herein by reference.

BACKGROUND OF THE INVENTION

1. Field of the Invention

The present invention relates to a method for finding a minimal signed digit with variable multi-bit coding; and, more particularly, to a method for finding a minimal signed digit with variable multi-bit coding based on Booth's algorithm.

This work was supported by the IT R&D program for MIC/IITA [2005-S-405-02, "A Development of the Next Generation Internet Server Technology"].

2. Description of Related Art

A conventional variable multi-bit coding scheme can be applied to multiplication and matrix operations using a fixed multiplier. These operations are the ones required for digital filters or various kinds of transforms such as Discrete Cosine Transform (DCT), and Inverse DCT (IDCT).

Especially, the conventional variable multi-bit coding scheme exhibits high efficiency in terms of speed and area consumption in the multiplication operation because it can obtain a partial product to conduct the multiplication operation with only simple wiring of data path.

Meanwhile, among methods of reducing the number of partial products generated in the multiplication operation, one of them is well-known to reduce the number of partial products by finding Minimal Signed Digit (MSD) with Canonical Signed Digit (CSD). Such a method has to find corresponding values in a table one by one in bitwise scanning manner.

In addition, there is also another method which reduces the number of partial products by finding MSD with variable multi-bit based on Booth's algorithm.

As well-known in the art, according to the Booth's algorithm, the partial product generated by overlapping a multiplier in 2-bit units and then coding the same in the multiplication operation is implemented only by shift and addition operations. The Booth's algorithm is modified to be coded in 3-bit units by MacSorley, and Sam and Gupta proved that another Booth's algorithm can be applied from 3-bit to multi-bit. These Booth's algorithms commonly code a digit represented in a bit form by adding lower bits thereto and then overlapping this with their previous bits. Particularly, this coding is done by shifting the digit by a given length.

FIG. 1 is a view conceptually illustrating an example of a conventional method of applying Booth's algorithm to multi-bit in 2's complement representation.

Referring to FIG. 1, an n-bit digit 101 in 2's complement representation in the prior art is represented for each bit as a given n-bit multiplier Y in the multiplication operation.

First, in order to apply Booth's algorithm to the n-bit digit 101 in 2's complement representation, "0" is given to "$y_{-1}$" which is Least Significant Bit (LSB), as in the general Booth's algorithm. In addition, indexes are initialized as follows: m=0 and k=2.

Next, shift and scanning 102 are started from after k=3 by using the index values as above. Here, "m−1" denotes the location of LSB of a group selected for coding and "k" denotes the number of bits of a group selected for coding. At this time, the group 103 is designated as a group for k greater than 3 including LSB if one of bits within the group is "1" and the reset thereof is "0", or if one bit is "0" and the rest thereof is "1". Further, the group may be designated a group even when "1" is continuous from the lower bits or the upper bits.

The result of group designated as above corresponds to a value of $D_i$ which is a signed digit given as:

$$D_i^{m_i} = y_{L_i} + \sum_{j=0}^{m_i-3} y_{j+(L_i+1)} \cdot 2^j - y_{L_{(i+1)}} \cdot 2^{m_i-2} \qquad \text{Eq. 1}$$

(where, $m_i \geq 3$)

$$L_i = \sum_{j=1}^{i-1} m_j - i$$

$$\left(\text{where, if } i = 1, \text{ then } \sum_{j=1}^{i-1} m_j = 0\right)$$

The conventional method which finds a minimal signed digit with variable multi-bit based on Booth's algorithm as above requires an additional addition operation for computing a value of signed digit SD generated as the number of bits increases.

FIGS. 2A and 2B are views illustrating one example of a conventional method for finding a minimal signed digit using variable multi-bit coding.

Referring to FIGS. 2A and 2B, the conventional method which finds a minimal signed digit with the variable multi-bit coding employs Eq. 1 set forth above. That is, $D_i$ which is a signed digit SD is obtained by calculating $L_i$ by Eq. 1 above. At this time, it is possible to confirm whether a multiplicand Y of multiplication operation is identical to the original value thereof, as in FIGS. 2A and 2B. The multiplicand Y is calculated as follows:

$$Y = \sum_{i=1}^{l} D_i^{m_i} \cdot 2^{L_i+1} \qquad \text{Eq. 2}$$

FIG. 2A describes a 2's complement representation of fixed coefficient "−2098".

Here, if the number of signed digits SD, i.e., l=4, and m1=5, m2=3, m3=6 and m4=6, $L_i$ can be obtained by using Eq. 1 as:

$L_1 = -1$ $L_2 = m_1 - 2 = 3$ $L_3 = m_1 + m_2 - 3 = 5$ $L_4 = m_1 + m_2 + m_3 - 4 = 10$ $L_5 = m_1 + m_2 + m_3 + m_4 - 5 = 12(\text{Not used})$ Eq. 3

Next, $D_i$ can be found from $L_i$ obtained from Eq. 3 above, the result of which is "Y=−2098", as follows:

$D_1^5 = 0 + 0 \cdot 2^0 + 1 \cdot 2^1 + 1 \cdot 2^2 - 1 \cdot 2^3 = -2$ $D_2^3 = 1 + 0 \cdot 2^0 - 0 \cdot 2^1 = 1$ $D_3^6 = 0 + 1 \cdot 2^0 + 1 \cdot 2^1 + 1 \cdot 2^2 + 1 \cdot 2^3 - 1 \cdot 2^4 = -1$ $$D_4{}^6=1+0\cdot2^0+1\cdot2^1+1\cdot2^2+1\cdot2^3-1\cdot2^4=-1$$

$$Y=-2\cdot2^0+1\cdot2^4-1\cdot2^6-1\cdot2^{11}=-2098 \qquad \text{Eq. 4}$$

As another example, FIG. 2B shows a 2's complement representation of fixed coefficient "3784".

Here, if the number of signed digits SD, i.e., l=4, and m1=7, m2=3, m3=5 and m4=3, $L_i$ can be obtained by using Eq. 1, as follows:

$$L_1=-1$$

$$L_2=m_1-2=5$$

$$L_3=m_1+m_2-3=7$$

$$L_4=m_1+m_2+m_3-4=11$$

$$L_5=m_1+m_2+m_3+m_4-5=13(\text{Not used}) \qquad \text{Eq. 5}$$

Next, $D_i$ can be found from $L_i$ obtained from Eq. 5 above, the result of which is "Y=3784", as follows:

$$D_1{}^7=0+0\cdot2^0+0\cdot2^1+0\cdot2^2+1\cdot2^3+0\cdot2^4-0\cdot2^5=8$$

$$D_2{}^3=0+1\cdot2^0-1\cdot2^1=-1$$

$$D_3{}^5=1+0\cdot2^0+1\cdot2^1+1\cdot2^2-1\cdot2^3=-1$$

$$D_4{}^3=1+0\cdot2^0-0\cdot2^1=1$$

$$Y=8\cdot2^0-1\cdot2^6-1\cdot2^8+1\cdot2^{12}=3784 \qquad \text{Eq. 6}$$

As described above, the conventional method requires an additional addition operation for computing a signed digit SD, i.e., $L_i$, as given in FIGS. 2A and 2B, generated as the number of bits increases.

Consequently, there is a need for a method which finds a minimal signed digit with variable multi-bit coding based on Booth's algorithm while solving the above problems.

SUMMARY OF THE INVENTION

It is, therefore, a primary object of the present invention to provide a method for finding a minimal signed digit with variable multi-bit coding based on Booth's algorithm.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, there is provided a method for finding a minimal signed digit with variable multi-bit coding, including the steps of: scanning and grouping given multi-bit to which Booth's algorithm is applied, and checking the type of each group; deciding whether each group is to be performed by any one of a coding for positive number and a coding of negative number depending on the type of each group; if the type of each group indicates the coding for positive number, converting the value of each group into a corresponding value of different number system and finding a signed digit based on the converted value; if the type of each group indicates the coding for negative number, performing bitwise inverting on the value of each group; and converting multi-bit subjected to the bitwise inverting into a corresponding value of different number system, and finding a signed digit based on the converted value.

DESCRIPTION OF SPECIFIC EMBODIMENTS

The advantages, features and aspects of the invention will become apparent from the following description of the embodiments with reference to the accompanying drawings, which is set forth hereinafter, and thus, those skilled in the art will readily carry out the invention. Further, in the following description, well-known arts will not be described in detail if it seems that they could obscure the invention in unnecessary detail. Hereinafter, preferred embodiments of the present invention will be described in detail with reference to the accompanying drawings.

Figure 3:
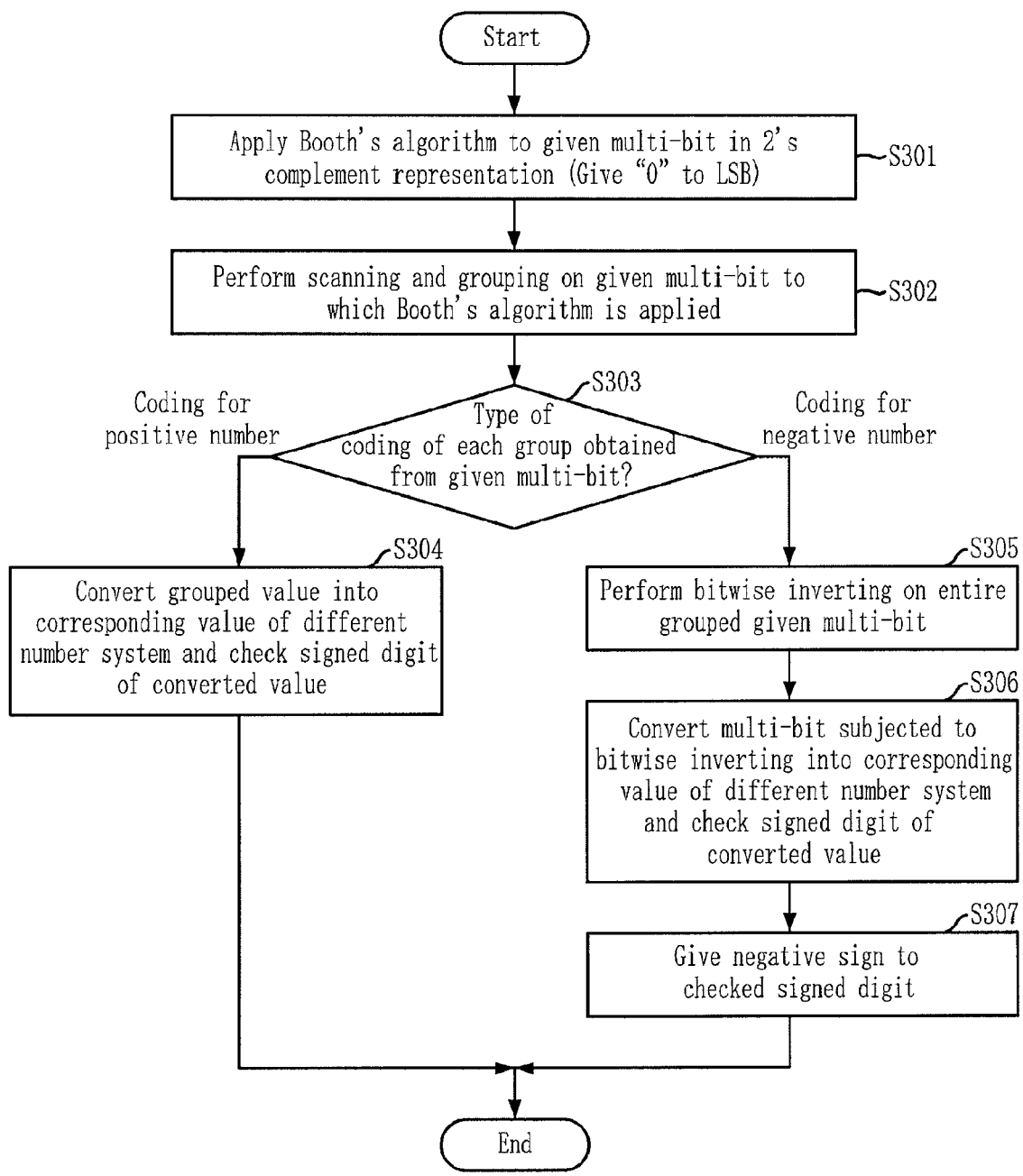
FIG. 3 is a flowchart illustrating a method for finding a minimal signed digit with variable multi-bit coding in accordance with an embodiment of the present invention.
Figure 4A:
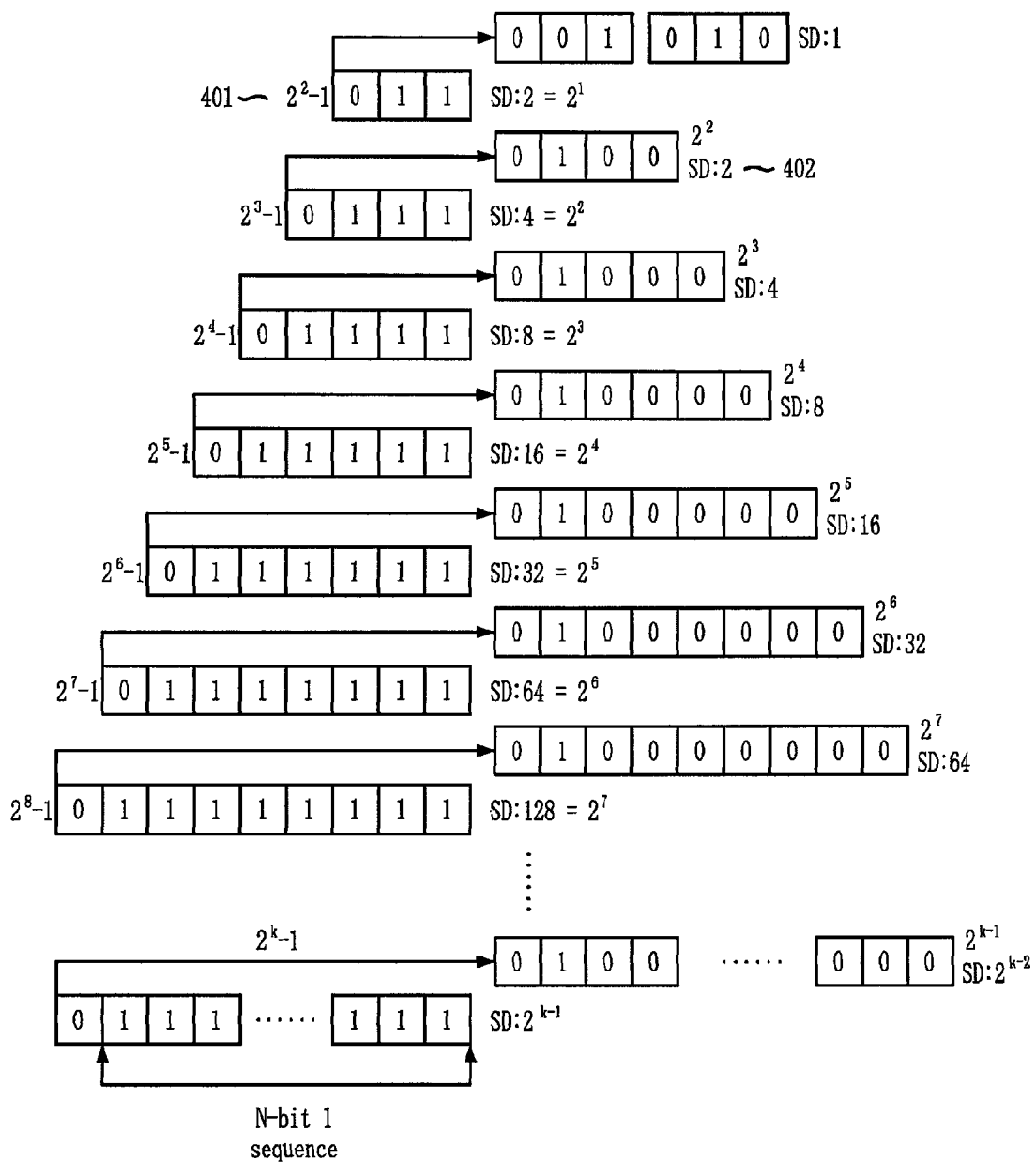
FIG. 4A is a conceptual view of a coding for positive number in accordance with an embodiment of the present invention.
Figure 4B:
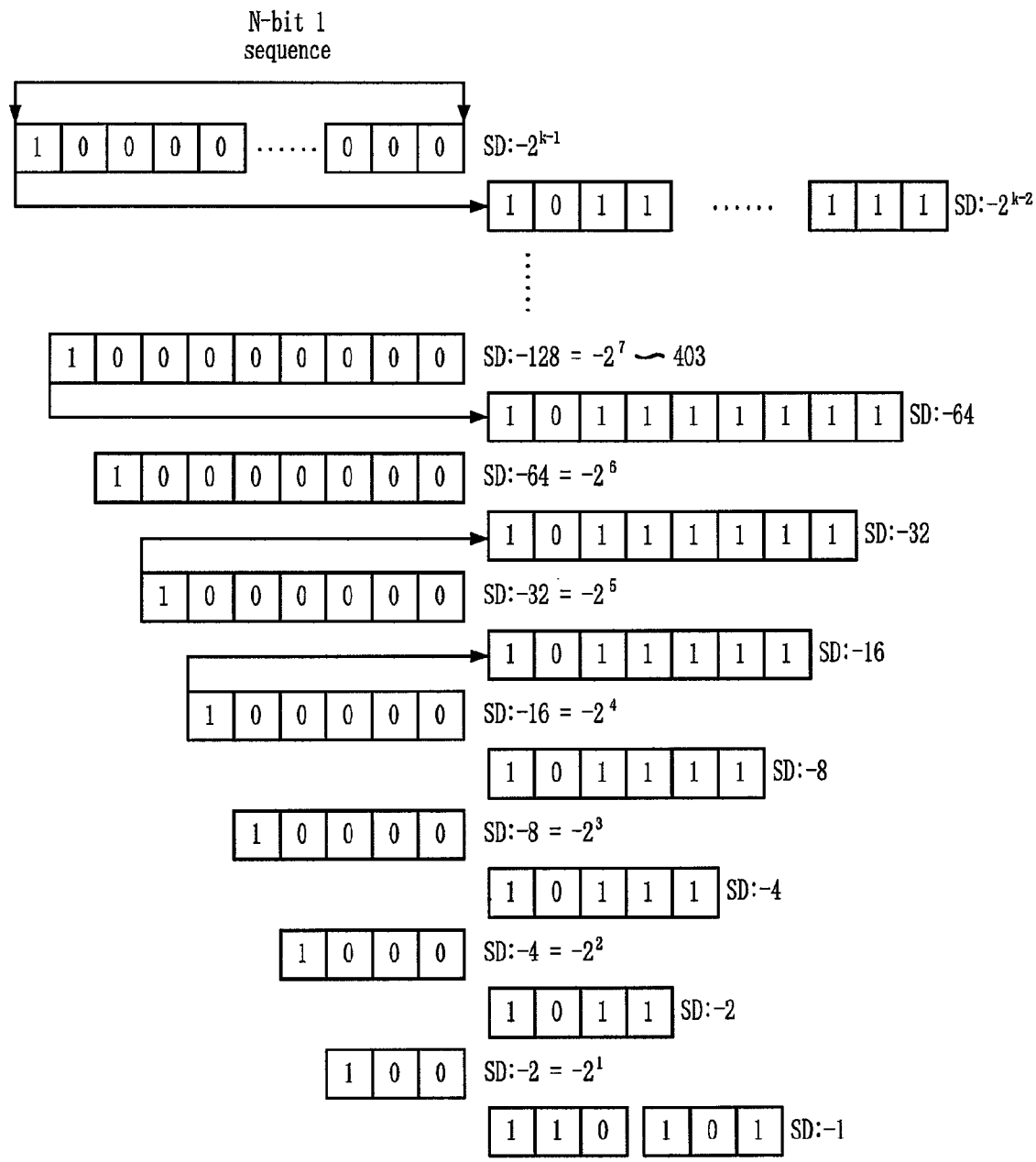
FIG. 4B is a conceptual view of a coding for negative number in accordance with the embodiment of the present invention.

FIG. 3 is a flowchart illustrating a method for finding a minimal signed digit with variable multi-bit coding in accordance with a preferred embodiment of the present invention, FIG. 4A is a conceptual view of a coding for positive number in accordance with an embodiment of the present invention, and FIG. 4B is a conceptual view of a coding for negative number in accordance with the embodiment of the present invention.

Before explaining FIGS. 3, and 4A and 4B, for convenience of explanation, it is first assumed that the method for finding a minimal signed digit with variable multi-bit coding of the invention is applied to a multiplier.

Figures 1, 2A, 2B:
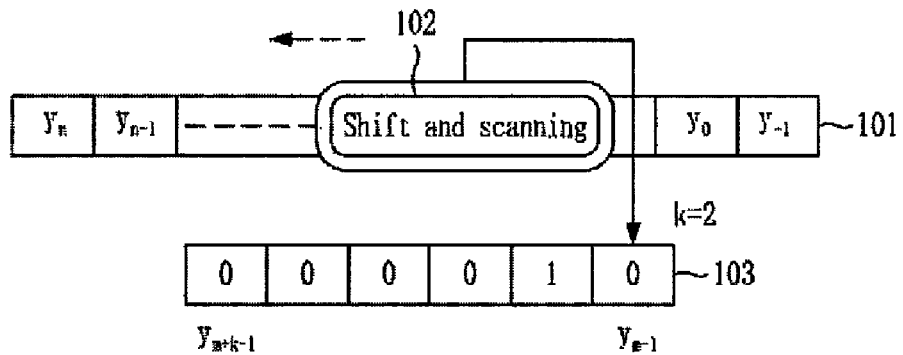
FIG. 1 is a view conceptually illustrating one example of a conventional method of applying Booth's algorithm to multi-bit in 2's complement representation.
FIGS. 2A and 2B are views illustrating one example of a conventional method for finding a minimal signed digit using variable multi-bit coding.

The multiplier uses a multiplier of multiplication as given multi-bit, as shown as in FIG. 1. That is, the multiplier inserts "0" to LSB by applying Booth's algorithm to the given multi-bit which is in a 2's complement representation in step S301.

Next, the multiplier scans and groups the given multi-bit to which the Booth's algorithm is applied as above in step S302. At this time, the multiplier selects bits after a $3^{rd}$ bit as a group and groups the same by a conventional technique. Here, the types of groups are as follows: a coding for positive number (i.e., MSB is "0") where all bits except the MSB "0" are "1" or all bits except the MSB "0" are "0" and only one bit is "1", and a coding for negative number (i.e., MSB is "1") where all bits except the MSB "1" are "0" or all bits except the MSB "1" are "1" and only one bit is "0".

In addition, if there is no type of group set forth above by scanning, the multiplier ends the grouping if the MSB of group as in FIG. 1 is identical to its preceding bit value (i.e., if $y_{m+k-1} \neq y_{m+k}$).

Thereafter, the multiplier checks whether each group obtained from the given multi-bit is a coding for positive number or a coding for negative number in step S303, and performs the following process depending on the result of checking.

First, in the coding for positive number, the multiplier converts a grouped value into a given value and checks a signed digit SD for the converted value in step S304. In other words, the multiplier converts the grouped value in 2's complement representation into decimal numeral and checks the signed digit for the converted value.

More specifically, the procedure of finding the signed digit based on the type of group in the coding for positive number will be described referring to FIG. 4A.

In FIG. 4A, "$2^k-1$" next to grouped multi-bit on the left side denotes a value converted from the grouped value. In other words, "$2^k-1$" is a value (decimal numeral) converted from the grouped value (binary numeral) in 2's complement representation. For example, in FIG. 4A, a signed digit of a grouped bit sequence "011" 401 is obtained as follows. First, a converted value (decimal numeral) of the grouped value (binary numeral) in 2's complement representation becomes "$2^2-1$". Then, a signed digit of "$2^2-1$" is given by "SD: $2=2^1$". For the above reason, if the converted value of the grouped value in 2's complement representation in the given multi-bit is "$2^k-1$", the signed digit becomes "$2^{k-1}$".

Further, in FIG. 4A, "$2^{k-1}$" next to grouped multi-bit on the right side denotes a value converted from the grouped value. In other words, "$2^{k-1}$" is a value converted from the grouped value (binary numeral) in 2's complement representation.

For example, in FIG. 4A, a signed digit of a grouped bit sequence "0100" 402 is obtained as follows. First, a converted value (decimal numeral) of grouped value (binary numeral) in 2's complement representation becomes "$2^2$". Then, a signed digit of "$2^2$" is given by "SD: $2=2^1$". For the above reason, if the converted value of the grouped value in 2's complement representation in the given multi-bit is "$2^{k-1}$" the signed digit becomes "$2^{k-2}$".

The above description can be represented, as in the following table 1, where the superscript is given by m.

TABLE 1

| | Type of group | Converted value of grouped value | Signed digit (SD) |
|---|---|---|---|
| $1^{st}$ case | If all bits except MSB "0" are "1" | $2^m-1$ | $2^{m-1}$ |
| $2^{nd}$ case | If all bits except MSB "0" are "0" and only one bit is "1" | $2^m$ | $2^{m-1}$ |

Meanwhile, in the coding for negative number, the multiplier first conducts bitwise inverting on the entire sequence of grouped given multi-bit and then performs the same coding as the coding for positive number in step S305.

At this time, the multiplier converts the multi-bit subjected to the bitwise inverting into a given value and finds a signed digit of the converted value in step S306. That is to say, the multiplier converts the multi-bit subjected to the bitwise inverting in 2's complement representation into decimal numeral and finds a signed digit of the converted value. At this time, the multiplier gives a negative sign to the checked signed digit in step S307.

To be more specific, the procedure of finding a signed digit depending on the type of group in the coding for negative number will be described below with reference to FIG. 4B.

In FIG. 4B, for example, in order to acquire a signed digit from a grouped bit sequence "100000000" 403, bitwise inverting is first performed for the entire multi-bit. Then, the bit sequence "100000000" 403 becomes a bit sequence "011111111".

Next, the multiplier carries out coding on the bit sequence "011111111", as in the coding for positive number. That is, the multiplier regards the bit sequence "011111111" as 2's complement representation and thus converts this into decimal numeral, which is "$2^8-1$". As a result, the signed digit therefor becomes "$-2^7$".

As mentioned above, if grouping is made as in multi-bit on the left side in FIG. 4B, the multiplier performs bitwise inverting on the entire multi-bit, determines the same as in the coding for positive number and codes it, and gives a negative sign to the signed digit. Namely, the multi-bit on the left side is considered to be equal to the multi-bit on the right side in the coding for positive number.

The above description can be represented, as in the following table 2, where the subscript is given by m.

TABLE 2

| | Type of group | Converted value of grouped value | Signed digit SD |
|---|---|---|---|
| $3^{rd}$ case | If all bits except MSB "1" are "0" | Same as bitwise inverting in $1^{st}$ case of Table 1 | $-2^{m-1}$ |
| $4^{th}$ case | If all bits except MSB "1" are "0" and only one bit is "0" | Same as bitwise inverting in $2^{nd}$ case of Table 1 | $-2^{m-1}$ |

Hereinafter, the method for finding a minimal signed digit with variable multi-bit coding in accordance with the invention will be described in more detail with reference to FIG. 2B.

First of all, the coding for positive number will be explained by using $D_1^7$ in FIG. 2B.

Here, $D_1^7$ is a bit sequence "0010000".

In $D_1^7$, the superscript "7" denotes 7-bit grouping and the subscript "1" denotes a $1^{st}$ group. That is, $D_1^7$ increases that the $1^{st}$ group is coded with 7-bit. Here, according to Table 1, $D_1^7$ corresponds to a case where all bits except MSB "0" are "0" and only one bit is "1" in case of performing 7-bit grouping. In other words, in case of $D_1^7$, the converted value of grouped value is "$2^4$" in decimal numeral, and thus, its signed digit is "$2^3$".

Now, the coding for negative number will be described by using $D_3^5$ in FIG. 2B.

Here, $D_3^5$ is a bit sequence "11101".

In $D_3^5$, the superscript "5" denotes 5-bit groping and the subscript "3" denotes a $3^{rd}$ group. That is, $D_3^5$ represents that the $3^{rd}$ group is coded with 5-bit.

Here, according to Table 1, $D_3^5$ corresponds to a case where all bits except MSB "1" are "1" and only one bit is "0" in case of performing 5-bit grouping. Thus, the bit sequence "11101" of $D_3^5$ becomes "00010" if it is subjected to bitwise inverting. In other words, in case of $D_3^5$, the converted value of grouped value is "$2^1$" in decimal numeral, and thus, its signed digit is "$-2^0$".

As a result, the present invention does not require an additional addition operation for computing a value of signed digit generated as the number of bits increases, by acquiring a minimal signed digit by variable multi-bit coding through the use of the Booth's algorithm.

As described above, the present invention can easily implement an additional operation for computing a value of signed digit generated as the number of bits increases.

In addition, the present invention can obtain the signed digit with the number of groups, thereby minimizing the area required for program implementation and hardware manufacturing and costs incurred to meet the required performance.

Furthermore, the present invention can be effectively applied to transform works where constant multiplication is frequently used, digital filter, or the like.

The method of the present invention as mentioned above may be implemented by a software program that is stored in a computer-readable storage medium such as CD-ROM, RAM, ROM, floppy disk, hard disk, optical magnetic disk, or the like. This procedure may be readily carried out by those skilled in the art; and therefore, details of thereof are omitted here.

While the present invention has been described with respect to the specific embodiments, it will be apparent to those skilled in the art that various changes and modifications may be made without departing from the spirit and scope of the invention as defined in the following claims.

What is claimed is:

1. A non-transitory computer-readable recording medium, having recorded thereon a method for finding a minimal signed digit with variable multi-bit coding of a number represented in a bit format, comprising the steps of:

scanning and grouping, by a processor, the number represented in binary format into groups of bits of varying sizes to which Booth's algorithm is applied, and checking the type of each group;

determining, based on the type of each group, whether any one of a coding for positive number and a coding of negative number is to be performed on each group;

when the type of a group indicates the coding for positive number is to be performed, converting the value of the group into a corresponding value of a different number system and finding a signed digit based on the converted value; and when the type of a group indicates the coding for negative number is to be performed, performing bitwise inverting on the value of the group and converting the bitwise inverted group into a corresponding value of a different number system, and finding a signed digit based on the converted value.

2. The non-transitory computer-readable recording medium of claim 1, further comprising in the step of determining whether any one of the coding for positive number and the coding of negative number on each group, when there is no type corresponding to a group, ending the grouping unless the most significant bit grouped is identical to its preceding bit value.

3. The non-transitory computer-readable recording medium of claim 1, wherein, in the step of scanning and grouping the number represented in binary format into groups of bits of varying sizes, the groups of three or more bits are subjected to grouping.

4. The non-transitory computer-readable recording medium of claim 1, wherein in the step of determining whether any one of the coding for positive number and the coding of negative number is to be performed on each group, when the type of a group indicates the coding for positive number, all bits except the most significant bit "0" are "1" or all bits except the most significant bit "0" are "0" and only one bit is "1"; and when the type of a group indicates the coding for negative number, all bits except the most significant bit "1" are "0" or all bits except the most significant bit "1" are "1" and only one bit is "0".

5. The non-transitory computer-readable recording medium of claim 4, wherein when the type of a group indicates the coding for positive number, if all bits except the most significant bit "0" are "1", the converted value of the grouped value is found as "$2^m-1$" and its signed digit as "$2^m$".

6. The non-transitory computer-readable recording medium of claim 4, wherein when the type of a group indicates the coding for positive number, if all bits except the most significant bit "0" are "0" and only one bit is "1", the converted value of grouped value is obtained as "$2^m$" and its signed digit as "$2^m-1$".

7. The non-transitory computer-readable recording medium of claim 4, wherein when the type of a group indicates the coding for negative number, if all bits except the most significant bit "1" are "0", the converted value is found as "$2^m-1$" and its signed digit as "$-2^{m-1}$" after performing bitwise inverting on the grouped value.

8. The non-transitory computer-readable recording medium of claim 4, wherein when the type of a group indicates the coding for negative number, if all bits except the most significant bit "1" are "1" and only one bit is "0", the converted value is found as "$2^m$" and its signed digit as "$-2^{m-1}$" after performing bitwise inverting on the grouped value.

9. The non-transitory computer-readable recording medium of claim 1, wherein when converting the value of each group or converting bitwise inverted group, the different number system is a decimal numeral system.

* * * * *